INVENTOR.
Benjamin P. Hecht
BY Edwin J. Fredenburgh

United States Patent Office 2,732,326
Patented Jan. 24, 1956

2,732,326

ANTIMICROBIC COMPOSITION OF PEPTONE BASE BUFFERED WITH GLUCONIC ACID

Benjamin P. Hecht, Dorchester, and Edwin J. Fredenburgh, Concord, Mass.

Application February 5, 1951, Serial No. 209,475

3 Claims. (Cl. 167—58)

The present invention relates to the application of controlled hydrogen-ion concentration in producing a sustained pH that serves as a basis for effecting an antimicrobial action and relates also to means for augmenting the effectiveness of hydrogen-ions as an anti-microbial agent.

We have found by experimentation that in certain medicines and preparations a beneficial effect is obtained which may be of a bacteriacidal nature if the medicine or preparation has a hydrogen-ion concentration which is maintained within certain given limits, the lower limit defined by the ability of the body to withstand the hydrogen-ion concentration. When the hydrogen-ion concentration drops below 2.5 as an extreme limit, irritation is produced in human tissue but if concentration is maintained in the vicinity of 3.5, then there is a sufficient safety factor wherein the beneficial antibacterial effect is observed. The above also applies in certain instances to fungi.

While certain types of bacteria are affected by hydrogen-ion concentration in the vicinity of pH 5.0 in general, the greater benefit is not realized until the pH goes below 4.1.

The above is accomplished by the use of a buffer system in suitable acid and base components to provide and maintain the desired pH or hydrogen-ion concentration while the product is being used. The nature and strength of the acid and base are an important consideration in the composition of materials used and these will be discussed later. These components operate in liquids, semi-solids and solids, provided moisture comes into play either by direct mixing or by contact to permit the formation of hydrogen-ions.

Figure 1:
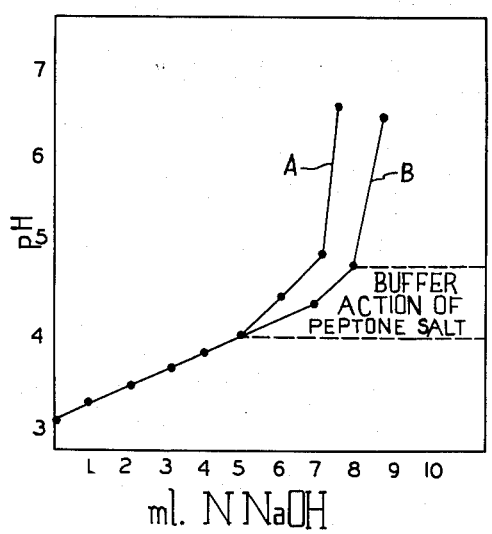
Figure 2:
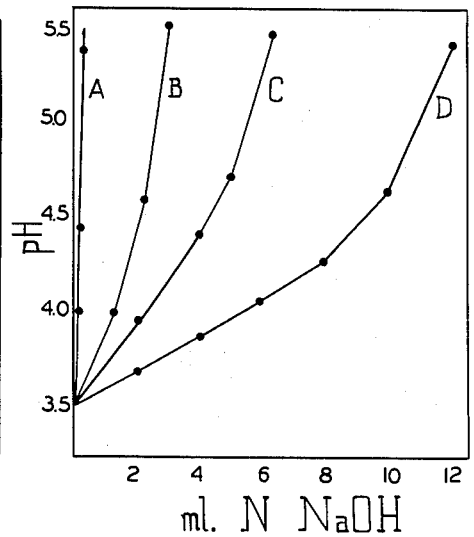
Figure 3:
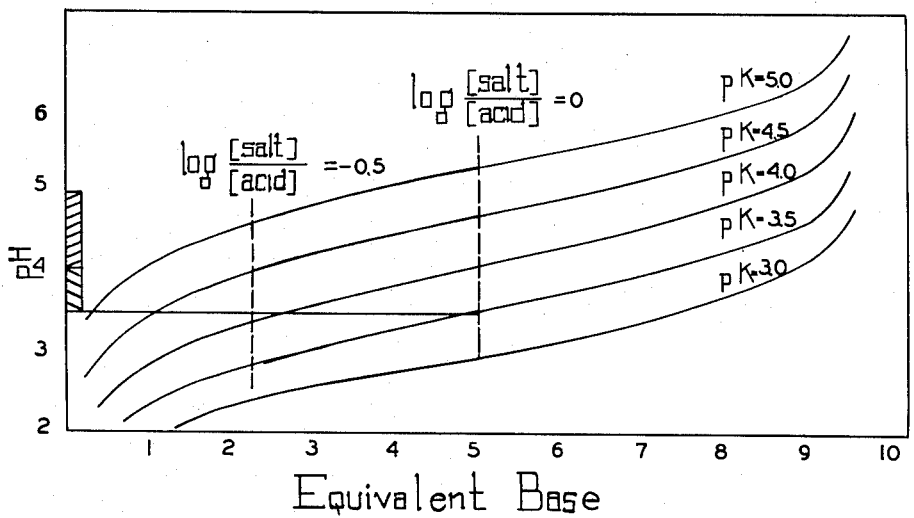

In the present application, certain curves shown as Figures 1, 2 and 3, will be referred to in connection with the specification, but in a capacity as explaining the phenomena of the present invention and not as drawings of a mechanical nature.

The use of a solution having a strength of pH 3.0 for antisepsis, containing one tenth the concentration of hydrogen-ions compared with a solution of pH 2.0, allows as much as a ten fold factor for the safety margin. To provide additional protection against toxicity of hydrogen ions, we prefer to operate at approximately pH 3.5, still under the limiting pH for growth of bacteria. This range insures 70% greater safety over the pH 3.0 value.

The successful application of hydrogen ion for antisepsis depends upon effective control of pH in the established range which should remain in the vicinity of 3.5 and perhaps not drop much below 3.0 or 3.2 so as to provide the necessary factor of safety. A suitable buffer must therefore be devised for this purpose, particularly as the use of an acid per se cannot be expected to provide for constant pH. A suitable buffer developed for this purpose should contain free, weak acid, which generally constitutes part of the buffer system, but in addition such a buffer includes preferably a very weak base in the form of salts of the weak acid. Alkaline substances that come in contact with such a buffer are not only neutralized by the weak acid present, but also by interchange of cations unlike as in conventional buffer systems. In this manner a more efficient buffer system is produced.

As a suitable substance, Peptone (Bacto-Peptone) was selected for the very weak base in the buffer system because it has an ionization constant much smaller than that for ammonium hydroxide, indole, and other amine products of bacterial metabolism. Peptone neutralizes basic compounds by a reaction formulated as follows:

Peptone Salt+Base→Peptone+Salt of Base
$K_b > 10^{-10}$    $K_b < 10^{-10}$

Peptone used for this purpose is not a single substance, but a complex of proteoses, peptones, amino acids, and other degradation products of enzymatic hydrolysis of proteins. The dissociation constants, $K_b$, of these constituents however are all of low magnitude which we have established as $<10^{-10}$, based upon a negative exchange reaction of cations when peptone and aniline chloride were dissolved together. The ionization constant for the latter base is $3.83 \times 10^{-10}$ at 25° C.

An example of the buffer action of peptone is shown in Figure 1 in the range pH 4.2 to pH 4.9. This is demonstrated by titration of acid (Fig. 1) in the presence of peptone compared to acid in the presence of sodium hydroxide. Figure 1 shows that the pH effect is more sustained at a lower value in curve B than in A, B being the sample in which the peptone was used.

The curves of Figure 1 were taken with a volume of 100 ml. of 2% gluconic acid adjusted to pH at 3.2 at the start with sodium hydroxide and peptone each to form (A) sodium gluconate-gluconic acid buffer and (B) peptone gluconate-gluconic acid buffer respectively by titration with sodium hydroxide. The two curves stay together until approximately the pH has attained a value of 4.2 with a titration equivalent to 5 ml. of sodium hydroxide after which the two curves separate indicating that much more sodium hydroxide is necessary to obtain the same value of pH after this point in the case of curve B in which the buffer was peptone. Peptone therefore affords additional buffer capacity nearly superimposing the buffer action accounted for by the presence of weak acid in the buffer system.

The choice for peptone as the base is also dependent upon its solubility, diffusibility, lack of toxicity, availability and inexpensiveness.

Further demonstration of buffer action of peptone is provided by the comparison of the relative slopes of titration curves for solutions of gluconic acid and gluconic acid with peptone gluconate (Figure 2).

Figure 2 shows the relationship of buffer capacity to peptone concentration in gluconic acid buffer solutions. The curve A shows gluconic acid without peptone; curve B shows gluconic acid with 1% peptone; curve C shows gluconic acid with 2.5% peptone; D shows gluconic acid with 5% peptone. These titration curves A to D, were obtained by neutralization of 100 ml. volumes of the unbuffered and buffered gluconic acid solutions each with pH of 3.5.

It will be seen in these curves that the buffer capacity is approximately proportional to the peptone concentration.

Selection of an acid for inclusion in the buffer system comprises a very important consideration determining in part buffer capacity and buffer range. Furthermore, the ratio of salt to acid must be considered in relationship to the degree of ionization of the acid compound employed. Maximum buffer capacity is attained when dealing with an acid of appropriate strength of log (salt)/(acid)=0. However for the intended application of the product greater buffer capacity will be effected by reducing the log of the salt-acid ratio to about .5 as the only possible direction of change in pH is from decreasing H+. Figure 3 showing calculated titration curves as theoretical approximations, clarifies the significance of salt to acid concentrations. These titration curves determine that greatest buffer capacity results when the salt/acid ratio is set at the initial end of the flat portion of the titration curve where approximately log (salt)/(acid) = −0.5. The dissociation constant pK of the buffer acid for this application may now be computed from the Henderson-Hasselbalch equation, $$pK = pH - \log \frac{(BA)}{(HA)}$$

where $$pK = \log \frac{1}{Ka}$$

where Ka is the ionization constant.

Referring again to the titration curves in Figure 3, comparison is made of the relative buffer capacities for buffers of pH 3.5 employing acids of pK 4.0 and pK 3.5 to give the described salt/acid ratios. These two buffers possess identical buffer capacities in the region pH 3.5 to pH 4.1, but there is considerable extension of buffer capacity for the buffer of lower salt/acid ratio in the region pH 4.1 to pH 5.0.

In terms of equivalent base the latter buffer yields 100+ per cent additional buffer capacity for this pH range. For the buffer product application, therefore, an acid compound with an ionization constant of $Ka = 10^{-4}$ ($pK = 4.0$) is preferred to prepare the buffer of pH 3.5.

Figure 3 which shows theoretical titration curves of acids of pK values are derived from calculations based on expression $$pH = pK + \log \frac{BA}{HA}$$

under assumption that complete ionization of the salt is obtained in the titration.

Glucono, Delta lactone, which on hydration in solution forms gluconic acid in equilibrium with gamma and delta lactones and used in these experiments with peptone to compose the buffers, was used also in the buffers for the bacteriological studies. The ionization constant (Ka) of the acid is $2.5 \times 10^{-4}$ at 25.0° C. which is greater than the calculated theoretical value of $1 \times 10^{-4}$ for optimum buffer capacity. Selection of this particular acid was made because of the reasonable certainty that the undissociated acid was entirely devoid of pharmacological and bacteriological action and any antibacterial effect noted could be entirely attributed to H+ alone. Selection of this acid was also dependent upon other desirable physical and chemical properties of the acid, particularly its ready solubility, stability and lack of appreciable vapor pressure which otherwise would lead to irritation from acid vapors in practical use.

The buffer product applied to the bacteriological work which follows was prepared from 1 to 5 per cent Bacto-Peptone (Difco Laboratories) as the base constituent with gluconic acid (Pfizer & Co.) added to adjust the hydrogen ion concentration to pH 3.5.

Bacteriological study of Buffer of pH 3.5—The assemblage of organisms utilized to study the anti-bacterial action of hydrogen ions comprised a group of gram positive and gram negative bacteria; the hydrogen ions were furnished from ionization of gluconic acid. The concentration of this cation to inhibit the growth of the test organisms was established from pH measurements of inoculated broth containing varying quantities of the acid. The minimum concentration of hydrogen ions expressed as pH to completely inhibit bacterial growth is presented in Table IV. It is noteworthy to observe that growth inhibition of bacteria generally occurs in a rather narrow range of hydrogen ion concentration—pH 4.1–pH 4.9. In addition, one organism of the test group Corynebacterium diphtheriae was especially sensitive to the action of hydrogen as shown by inhibition of growth occurring at pH 6.6. On the basis of these findings, conclusion appears warranted regarding the reliance of hydrogen ions in its inhibitory effect on bacterial growth and the probable advantage gained from clinical use of a buffer of pH 3.5 to combat bacterial infections when applicable.

The nature of the antibacterial action caused by hydrogen ions at the concentration level of the peptone-gluconic acid buffer used was studied by F. D. A. immersion test technique. In general a bacteriostatic action was observed, although for Corynbacterium diphtheriae the buffer product proved decidedly bactericidal, and for Streptococcus pyogenes bactericidal to a less marked degree. Table IV includes this data.

The antibacterial action appears to be immediate once contact is made between organism and hydrogen ions. An examination of Escherichia coli showed complete and prompt cessation of motility on adding the buffer product to a suspension of the bacteria. A similar immediate response was obtained with Trichomonas vaginalis organisms.

Hydrogen ions exhibited a rather general action on all bacteria. This is an advantage over the antibiotics and sulfor amides and many other antibacterial agents or substances which vary in their effectiveness against gram positive and gram negative organisms because of their specificity.

TABLE IV

*pH level for inhibition of bacterial growth and antibacterial action of peptone-gluconic acid buffer of pH 3.5*

| Organism | Gram Stain | pH for Inhibition of Bacterial Growth | Antibacterial Action of Buffer of pH 3.5 |
|---|---|---|---|
| Escherichia coli | − | 4.65 | Bacteriostatic. |
| Proteus vulgaris | − | 4.10 | Do. |
| Klebsiella pneumoniae | − | 4.65 | Do. |
| Aerobacter aerogenes | − | 4.10 | Do. |
| Pseudomonas aeruginosa | − | 4.25 | Do. |
| Neisseria catarrhalia | − | 4.65 | Do. |
| Staphylococcus albus | + | 4.70 | Do. |
| Staphylococcus aureus | + | 4.70 | Do. |
| Streptococcus pyogenes | + | 4.65 | Bactericidal [1] |
| Corynebacterium diphtheriae | + | 6.60 | Do. [2] |

[1] Bactericidal in 30 minutes immersion test.
[2] Bactericidal in 1 minute immersion test.

pH to cause inhibition of bacterial growth was determined by varying the amount of gluconic acid added in inoculated culture broth and the pH was read after 48 hours incubation at 37° C., using a Beckman pH meter with glass electrode. Antibacterial action of peptone-gluconic acid buffer of pH 3.5, containing 1 per cent of the base constituent, was observed by employing the Standard F. D. A. Immersion Test. The bacteria used in these tests were obtained from a twenty-four hour test culture in nutrient broth.

It is known that some micro-organisms have a coating or cuticle which is protective and may interfere with wetting and penetration of antiseptic agent. The inclusion of a wetting agent in the buffer product appears to enhance the action of hydrogen-ions as an antiseptic agent. It may be theorized that the wetting agent permits more rapid penetration of the hydrogen ions as a result of the wetting of the surface of the micro-organisms.

While many types of wetting agent may be used with this product, we have found polyoxyethylene sorbitan monoleate and other fatty acid derivatives of polyoxyethylene sorbitan to possess unique properties, particularly when the product is employed for therapeutic effect against some micro-organisms.

"Peptone" in solution at low pH and in concentrations of greater than 1% at neutral pH, forms a turbidity and may even develop a precipitate on standing. The precipitate is probably a proteose fraction present in commercial peptone products. Peptone solutions also have a disagreeable odor. The intensity of the odor is increased by heating peptone solutions. We have found that the undesirable odor and the less soluble fraction of "peptone" can be removed by a simple adsorption process using activated charcoal as the adsorbent. The process is carried out as follows:

To 100 cc. of the peptone solution at approximately neutral pH (6.5–7.0) 1 gm., of activated charcoal is added. The temperature of the mixture is brought up to 60° C., and then the mixture thoroughly stirred. The mixture is then filtered. The filtrate thus obtained may then be acidified to any desired pH. The peptone solution prepared as above retains its clarity on standing even in concentrations of peptone of 5% or more, and the solutions are also nearly colorless and odorless.

The effectiveness of hydrogen-ions as an antiseptic agent may be greatly increased by combination with other antiseptic agents to produce a potentiation action, i. e. the action of the combination of hydrogen-ions and other antiseptic agent exceeds the arithmetical sum of the two susbtances.

Potentiation produced by hydrogen-ions with other agents occurs at pH 3.5. This pH operates to inhibit bacterial growth processes generally; potentiation is not evident at much higher pH because bacteria are not inhibited generally above pH 4.1.

A buffer product is used at pH 3.5 to maintain the necessary hydrogen-ion concentration level in order to insure potentiation in practical application, though unbuffered acids could suffice for certain applications.

The combination of hydrogen-ions with other substances to produce a potentiation effect permits such a product to be used topically against all types of microorganism, including bacteria and fungi. Furthermore the toxicity of the antiseptic agents used in combination with hydrogen-ions is minimized because they can be used in lower concentrations with great effectiveness as a result of potentiation present.

The following data which we present demonstrates potentiation of the hydrogen-ions with other known antispetic agents.

*Dilution of merthiolate for germicidal effect*

| pH | Staph. Aureus | E. Coli |
|---|---|---|
| 7.0 | 10,000 | 5,000 |
| 4.0 | 75,000 | 25,000 |
| 3.0 | 75,000 | 100,000 |

*Potentiation action of hydrogen-ion and sodium benzoate (benzoic acid) at pH 3.5*

| Organism | Antimicrobial Action Observed ||| Potentiation Observed |
|---|---|---|---|---|
| | pH 3.5 Buffer | pH 3.5 Buffer, 0.2% Benzoate | 0.2% Benzoate | |
| E. coli | Bacteriostatic | Bacteriostatic | None | – |
| Aerobacter aerogenes | do | Bactericidal | do | + |
| Staph. aureus | do | Bacteriostatic | do | – |
| M. catarrhalis | do | Bactericidal | do | + |
| B. proteus | do | do | do | + |
| Kleba. pneum | do | Bacteriostatic | do | + |
| P. aeruginosa | do | Bactericidal | do | + |
| T. mentagrophytes | Fungicidal | Fungicidal | do | – |
| T. rubrum | None | do | do | + |
| M. lanosum | do | Fungistatic | do | + |
| C. albicans | do | do | do | + |
| P. ovale | do | do | do | + |

*Potentiation of antibacterial action of chlorthymol by hydrogen-ions against Escherichia coli organisms is shown in the following block chart.*

| Antibacterial Preparation | Antibacterial Response |
|---|---|
| Gluconic Acid pH 3.5 | Bacteriostatic. |
| Chlorthymol a 0.05% | Do. |
| Gluconic Acid pH 3.5 with 0.05% Chlorthymol a | Bactericidal in 5 minutes exposure test; partially bactericidal in 1 minute exposure test. | a Solubilized by 1% "Tween 80."

In a base preparation of the nature described above the following components may be used.

To a solution of peptone from 1 to 5% enough gluconic acid may be added to give a pH of 3.5, the necessary amount of which will vary slightly with the kind and quality of peptone. Any percentage of peptone in solution can be used up to saturation of the peptone, the important thing being to add sufficient gluconic acid to bring down the value of pH to the vicinity of 3.5. I have found that peptone (Bacto-peptone of Difco Lab.) or other peptone products prepared preferably by enzymatic hydrolysis is suitable. Other peptones may also be used with varying degrees of results, depending upon their activity as a base. To the above there may be added: ½% to 1% "Tween 80" (polyoxyethylene sorbitan monoleate) or other fatty acid derivative as a wetting agent. 1% charcoal (activated) to remove odor of commercial peptone.

For action of potentiation the solution of peptone and gluconic acid established with a pH of 3.5 may be combined with any of the following:

Merthiolate _____ .004 to .01%
Benzoic acid _____ .2%

Chlorthymol .05% approximately. Chlorthymol and "Tween 80" should first be combined and then added to the solution. The "Tween 80" will keep Chlorthymol in perfect solution. Only small amounts of "Tween 80" will be necessary. Other wetting agents of the type described may also be used.

Other bases may be used instead of peptone, such as sodium hydroxide NaOH. Gluconic acid 1 to 3% may be added to bring the solution to the vicinity of a pH of 3.5. Also Ammonia (NH4OH) could similarly be used. In fact most any base which is not harmful to the human system may be used, but acids must be chosen on the following basis. Condition prevailing is that pH should be approximately around 3.5 (3 to 4). Using the formula $$pK = pH - \log \frac{BA}{HA}$$

and fixing the log $$\left(\frac{BA}{HA}\right)$$

as about −0.5 for the log of the ratio of the salt to acid, the pK range will be approximately 3.5 to 4.5. Any compatible acid, non toxic, non-harmful may theoretically be used. Suitable acids for this purpose are the following:

| | pK |
|---|---|
| B-Alanine | 3.6 |
| Formic acid | 3.8 |
| Glycocolic acid | 4.4 |
| Gluconic acid | 3.6 |
| Lactic acid | 3.8 |
| Succinic acid | 4.2 |
| Acetic acid | 4.7 |

In using the above acids the same procedure as described above would be followed. The acid would be combined with peptone or other base to establish a value of pH at about 3.5 or from 3 to 4. To the above combination of acid and base may be added a suitable wetting agent and if desired activated charcoal and further the formula may be used with suitable antiseptics where the results amount to a potentiation over either of the substances used alone.

The amount of base, acid and salt as expressed above and use in this specification and claims, are measured or expressed as molar equivalents.

It should also be noted that as long as the antiseptic agent combined with the acid preparation of a pH of 3.5 or thereabouts is not chemically altered by the acid, a potentiation will result. This so far as we know applies quite generally to usual antiseptics.

Having now described my invention, I claim:

1. A compound for topical application to the human skin for antimicrobic action, comprising a peptone base buffered with gluconic acid having initially a salt to acid ratio in which $$\log \frac{\text{salt}}{\text{acid}} = -0.5$$

with the acid providing a pH of the composition within the range of 3 and 4.

2. A compound for topical application to the human skin for antimicrobal action, comprising gluconic acid buffered with a salt of gluconic acid having initially a salt to acid ration in which $$\log \frac{\text{salt}}{\text{acid}} = -0.5$$

with the acid providing a pH of the composition within the range of 3 and 4.

3. A compound as set forth in claim 1 with the addition of an antiseptic agent providing a substantial increase in the antiseptic action of the compound and the antimicrobal action of the buffer.

References Cited in the file of this patent

Pulaski: The American J. Pharmacy, volume 119, pages 388 to 394 (1947).

Tekelenburg Chemical Abstracts, volume 22 (1928), pages 2385–6.

Stern: The Urologic and Cutaneous Review, volume 50, 1946, pages 106–107.

MacKee: J. Invest. Dermatol., volume 7 (1946), pages 43–47.

Harry: JAPA Prac. Pharm. Ed., October 1942, pages 340–343.

FOREIGN PATENTS 116,521    Sweden _____ June 4, 1946